United States Patent
Heiler et al.

(10) Patent No.: US 10,088,829 B2
(45) Date of Patent: Oct. 2, 2018

(54) DIAGNOSTIC DEVICE AND METHOD FOR MONITORING THE OPERATION OF A CONTROL LOOP

(71) Applicant: Siemens Aktiengesellschaft, Munich (DE)

(72) Inventors: Patrick Heiler, Waghaeusel (DE); Bernd-Markus Pfeiffer, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 292 days.

(21) Appl. No.: 15/012,177

(22) Filed: Feb. 1, 2016

(65) Prior Publication Data
US 2016/0239015 A1 Aug. 18, 2016

(30) Foreign Application Priority Data
Feb. 16, 2015 (EP) .................... 15155283

(51) Int. Cl.
- *G05B 13/02* (2006.01)
- *G05B 19/406* (2006.01)
- *G05B 23/02* (2006.01)

(52) U.S. Cl.
CPC ......... *G05B 19/406* (2013.01); *G05B 23/024* (2013.01); *G05B 2219/42001* (2013.01)

(58) Field of Classification Search
CPC ............... G05B 19/406; G05B 23/024; G05B 2219/42001
(Continued)

(56) References Cited

U.S. PATENT DOCUMENTS

| | | |
|---|---|---|
| 5,838,561 A | 11/1998 | Owen |
| 2002/0177909 A1* | 11/2002 | Fu ................. G05B 13/042 700/28 |

(Continued)

FOREIGN PATENT DOCUMENTS

| | | |
|---|---|---|
| CN | 103353753 | 10/2013 |
| EP | 1 528 447 | 5/2005 |
| EP | 1528447 | 5/2005 |

OTHER PUBLICATIONS

Ghraizi et al: "Performance monitoring of industrial controllers based on the predictability of controller behavior"; Computers & Chemal Engineering; Pergamon Press; Oxford GB; Bd. 31 No. 5-6; pp. 477-486; XP005901775; ISSN: 0098-1354; DOI:10.1016/J.COMPCHEMENG.2006.06.009; 2007.

(Continued)

*Primary Examiner* — Fernando Hidalgo
(74) *Attorney, Agent, or Firm* — Cozen O'Connor

(57) ABSTRACT

A diagnostic device and method for monitoring the operation of a slave or ratio control loop in a meshed control structure of an automation system. The diagnostic device includes an evaluation device and a data memory for storing sequences of setpoint data and actual value data. The evaluation device determines a first dimension for the scatter of the actual-value data and a second dimension for the scatter of the setpoint data. A characteristic number ($CPI_{Var}$, $CPI_{Kas}$) for evaluating control quality is determined and/or displayed as a function of the ratio of the first dimension to the second dimension to enable an operator to evaluate the control loop status, permitting automated control loop evaluation of a fluctuating setpoint.

7 Claims, 2 Drawing Sheets

(58) Field of Classification Search
USPC .......................................................... 700/51
See application file for complete search history.

(56) References Cited

U.S. PATENT DOCUMENTS

2013/0046396 A1   2/2013  Blevins et al.
2016/0328421 A1*  11/2016 Sarratori ........... G06F 17/30271

OTHER PUBLICATIONS

Jeliali et al: "An overview of control performance assessment technology and industrial applications"; Control engineering Practice; Pergamon Press; Oxford GB; Bd. 14 Nr. 5; pp. 441-466; XP027906064; ISSN: 0967-0661; 2006.

* cited by examiner

DIAGNOSTIC DEVICE AND METHOD FOR MONITORING THE OPERATION OF A CONTROL LOOP

BACKGROUND OF THE INVENTION

1. Field of the Invention

The invention relates to a diagnostic device and method for monitoring the operation of a control loop of an automation system.

2. Background of the Invention

The maintenance and servicing of automation systems can be improved if subsystems or components are monitored to ensure that they are functioning correctly. In the event of reduced operational performance, it is possible to intervene selectively at the appropriate point of the system with maintenance, servicing or fault-clearance measures. Components of automation systems are typically interconnected in control loops. Identifying of reduced capacity of individual control loops to enable timely and selective intervention at the appropriate point of the system with measures for servicing or controller optimization would be enhanced by permanent and automatic monitoring of the control quality of control loops in the system.

A diagnostic method for monitoring the operation of a control loop is known from EP 1 528 447 B1. For a control loop having a substantially stationary status, i.e. with a substantially constant setpoint selection, the variance of a sequence of actual-value data is determined as a stochastic feature and evaluated for analysis of the status of the control loop. In the event of an excitation of the control loop corresponding to a setpoint step-change, the relative overshoot or the settling ratio, i.e. the quotient of rise and settling time of the control variable, can be evaluated as deterministic features for the analysis of the control loop status.

Automation systems, however, typically include numerous control loops to which known monitoring methods cannot be applied or can only be applied with extreme restrictions. This is in particular the case when, in the context of meshed control structures, controllers are controlled as slave controllers by another higher-ranking controller by means of setpoint selection. Hence, this applies to all slave controllers in cascade control systems and all slave controllers in ratio control systems. Since these regulators obtain their setpoints from another functional module of the interconnection in the meshed controller structure, the setpoint can change constantly and there are neither any temporal phases with a constant setpoint nor clean setpoint step-changes that can be evaluated in the context of the known monitoring of the control loop operation with reference to the determination of a stochastic feature or a deterministic feature. If the setpoint is obtained by a master controller in the context of a cascade control system, the setpoint fluctuates to the same degree as the manipulated variable of the master controller. If the setpoint is generated by a ratio module in the context of a ratio control system, the setpoint of the ratio controller is typically the actual value of another control loop, which can also be changed during operation, multiplied by a constant factor. Therefore, using the prior art method, subordinate control loops are generally excluded from monitoring.

OBJECTS AND SUMMARY OF THE INVENTION

The present invention is therefore based on the objective of providing a diagnostic device and a diagnostic method for monitoring the operation of a control loop by means of which it is possible to monitor the status of not only single-loop control loops but also control loops in meshed structures, such as are used, for example, in cascade control systems or ratio control systems.

The present invention provides the advantage, that, in addition to the monitoring of single-loop control loops, it also facilitates the monitoring of subordinate control loops in meshed structures with a plurality of controls, such for example in cascade control systems or ratio control systems. Advantageously as well, only the data that occurs in regular process mode are used, thus providing a non-invasive diagnosis. A process executed on an automated system is not influenced by the diagnosis and can continue to run undisturbed while a diagnosis is being carried out. It is no longer necessary, as in the prior art, to interrupt operation of automatic mode—e.g. by placing a master controller into manual mode to carry out a diagnosis to obtain, for analysis in the subordinate control loop with known stochastic or deterministic features, a temporal phase with a constant setpoint or a setpoint step-change for a slave controller. This is in particular achieved by inclusion of a dimension for the scatter of the setpoint data, preferably for the variance thereof, as a stochastic feature in the analysis of the control loop. Evaluation by an operator is possible in a particularly clear way since a characteristic number is determined on the basis of the ratio of a dimension for the scatter of the actual-value data to a dimension for the scatter of the setpoint data. A characteristic number of this kind for example greatly simplifies the comparison of the variances of the setpoint and actual value. If the slave controller is functioning ideally and succeeds in efficiently tracking the actual value with respect to the setpoint, the two variances will be of a similar size and the ratio will have approximately the value 1. If, on the other hand, the variance of the actual value is greater than that of the setpoint, the slave controller automatically disrupts the control loop, i.e. it is likely incorrectly set. This results in a corresponding change in the ratio and the characteristic number. Hence, the inventive method also permits the diagnosis of control loops with a permanently variable setpoint. As a consequence, slave controllers in cascade or ratio control systems can also be included in the control loop monitoring. This avoids a failure to observe problems in such control loops or the generation of misleading messages as a result of faulty evaluations of such control loops.

Because with cascade control systems system operators tend to pay more attention to the master controller than to the slave controller, and since an irregular response on the part of the slave control loop is not necessarily evident on the master control loop—particularly as the slave control loop is generally configured to be much quicker than the master control loop—there has heretofore been a serious risk that deteriorations in the slave control loop would remain unnoticed. Even if an irregular response on the part of the slave control loop does not have a significant impact on the final controlled variable, it could still result in drawbacks, such for example as more rapid wear of an actuating element or higher energy consumption since, in a cascade control system, the actuating element for the final controlled variable is controlled directly by the slave controller and not by the master controller.

In this case, the calculation of a first characteristic number $CPI_{Var}$ has the advantage that its values provide an operator with an impression of the status of the control loop in a very clear and easily understandable manner. For a control loop with good control response, a value of 100% for $CPI_{Var}$ will be displayed. This means that the variance of the actual value is lower than the variance of the setpoints. Therefore, the slave controller is able to efficiently track the actual value with respect to the setpoint. If the setpoint has radio-frequency signal components that lie outside of the bandwidth of the closed control loop, i.e. cannot quickly enough follow those of the slave controller, the variance of the actual value is lower than that of the setpoint. A response of this type is generally not cause for concern and is therefore indicated as good. If, on the other hand, the variance of the actual value is greater than that of the setpoint, the slave controller automatically disrupts the control loop, i.e. it is probably incorrectly set. The associated deterioration of the status of the control loop is advantageously displayed by values of the characteristic number $CPI_{Var}$, which are correspondingly lower than 100%.

The factor s used in the calculation formula for the characteristic number $CPI_{Var}$ is a sensitivity factor that can be set as a parameter by an operator and is preset in the diagnostic device with the value s=1. For example, for a more critical evaluation, the factor s can be corrected upward by operator input. To ensure that, with the value s=1 for the preset, which is very clear to the operator, an evaluation of the control loop quality suitable for the majority of cases is obtained by displaying the characteristic number $CPI_{Var}$, in addition to the sensitivity factor s, the formula comprises the further factor 0.5, which can obviously be omitted in the case of a different preset for the sensitivity factor s.

Additionally or alternatively to the first characteristic number $CPI_{Var}$, the diagnostic device can display a second characteristic number $CPI_{Kas}$ calculated on the basis of the average changes to the actual-value data and the setpoint data from one sampling step to the next in each case. While the first characteristic number $CPI_{Var}$ only takes into account the variance of values of the setpoint and actual-value data in the respective segment being considered, in the calculation of the second characteristic number $CPI_{Kas}$ the changes in the temporal steps of the sampling are compared with one another. If the actual value fluctuates around the setpoint but with a smaller amplitude compared to the value range of the setpoint, when only considering the first characteristic number $CPI_{Var}$, with a greater range of the segment considered of the sequences of setpoint and actual-value data, this drops only slightly or not at all, since the variance still remains similar. This unwanted response is then easy for an operator to identify when considering the second characteristic number $CPI_{Kas}$.

Hence, advantageously both the first characteristic number $CPI_{Var}$ and the second characteristic number $CPI_{Kas}$ are preferably displayed by the diagnostic device since consideration of both characteristic numbers enables a particularly reliable evaluation of the status of the control loop. The width of the segment considered in each case, i.e. the number N of setpoint or actual-value data in the sequences considered, is selected such that, on the one hand, changes to the status of the control loop can be easily recognized and, on the other, sufficient data is available for evaluation.

The diagnostic device can advantageously be embodied in the same way as the diagnostic device already known from EP 1 528 447 B1 as a software functional element, which can be switched in a graphical operator interface of an engineering system with functional modules of the control loop and loaded into an automation device for operation of the diagnostic device. The two calculated characteristic numbers $CPI_{Var}$ and $CPI_{Kas}$ are then displayed on a so-called faceplate of the man-machine interface on an operator-control and observation device of the automated system. If desired, an operator can change the parameterization on this operator-control and observation system, for example the sensitivity factor s, to input setpoints for the generation of an alarm in the event that one or both characteristic numbers or the like fall below a prespecified limit value.

In a particularly advantageous implementation, the inventive diagnostic device for monitoring the operation of a control loop can be implemented in a software environment for cloud-based control loop monitoring. One example of such a software environment is the data-driven remote service "Control Performance Analytics" from Siemens AG. Data from customer systems is collected, aggregated and sent to a Siemens Service Operation Center with the aid of software agents and stored on a remote service computer in the service operation center. There, it is evaluated semi-automatically with the aid of different "data analytics" software applications. If required, specially trained experts can work on this database in a highly efficient way for the remote service. The results of the data analysis can be displayed on a monitor of the remote service computer and/or made available on a SharePoint site so that they can be viewed by the final customer, i.e. the operator of the automated system, for example in a browser.

Hence, the diagnostic method of the present invention is preferably implemented in software or in a combination of software and hardware; the invention accordingly also relates to a computer program with computer-executable program code instructions for implementation of the diagnostic method. In this context, the invention also relates to a computer program product, in particular a data carrier or a storage medium, with a computer-executable computer program of this kind. As described above, such a computer program can be held in a memory of an automation device or loaded into the device so that, during operation of the automation device, the operation of a control loop is automatically monitored or, in the case of cloud-based monitoring of control loops, the computer program can be stored in a memory of a remote service computer or loaded into the remote computer.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several embodiments and figures.

DETAILED DESCRIPTION OF THE CURRENTLY PREFERRED EMBODIMENTS

Figure 1:
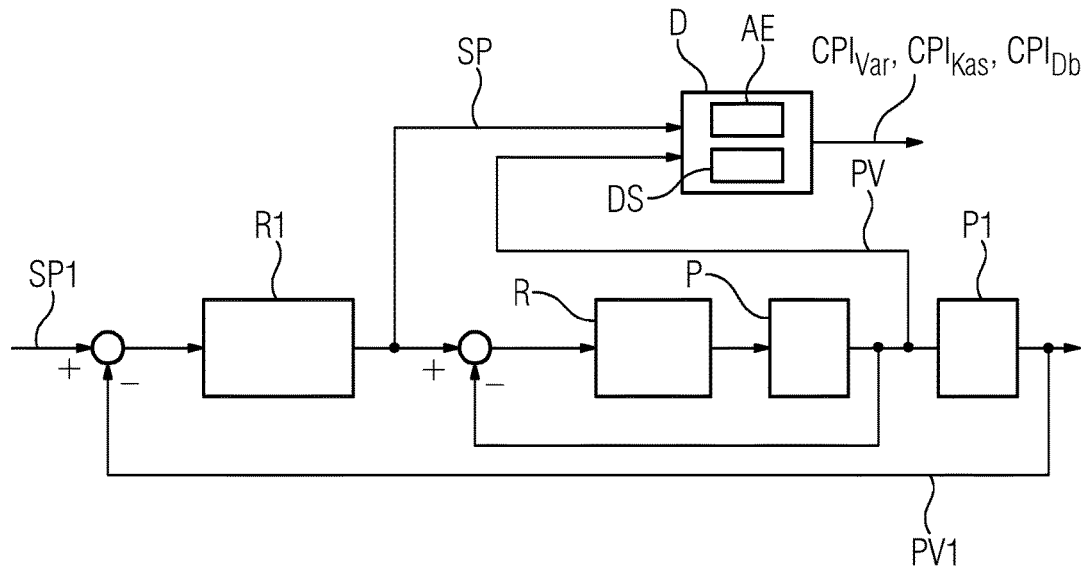
FIG. 1 is a schematic block depiction of a cascade control system with a diagnostic device.
Figure 2:
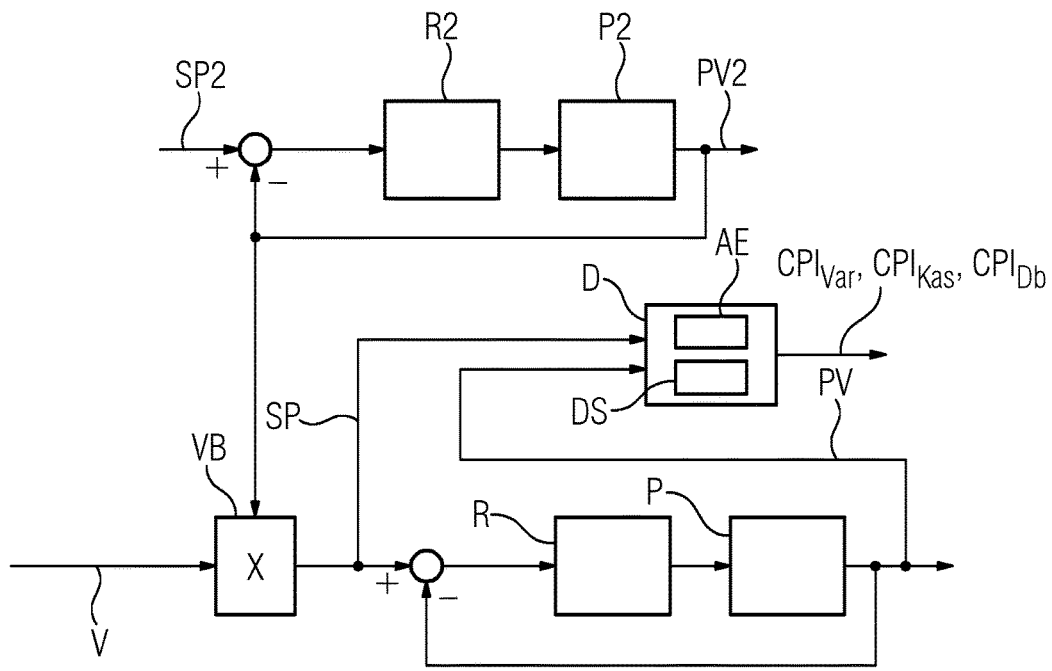
FIG. 2 is a schematic block diagram of a ratio control system with a diagnostic device.

FIGS. 1 and 2 depict, by way of example, control loops in meshed structure implemented in, respectively, a cascade control system and a ratio control system. A control loop to be monitored includes a controller R and a process P; the controller R is referred to as a slave controller in a cascade control system and as a ratio controller in a ratio control system. In a cascade control system such as that represented by FIG. 1, the controller R obtains its setpoint SP from a master controller R1, which is a component of an external control loop for controlling a controlled variable PV1 of a process P1. In the following description, the controlled variable PV of the process P is also referred to as the actual value. In a ratio control system such as that represented by FIG. 2, the setpoint SP is provided by a ratio module VB, which calculates the setpoint as the ratio of an actual value PV2 of another control loop and a ratio value V. The other control loop, the actual value PV2 of which is applied to the ratio module VB of FIG. 2, in turn includes a controller R2 and a process P2, and the other control loop is assigned a prespecified setpoint SP2. Hence, with the meshed structures depicted in FIGS. 1 and 2, the controller R as a slave controller or a ratio controller receives its setpoint SP from another control loop. Accordingly, in automatic mode the setpoint selection changes continuously and there are no time phases with a constant setpoint or clean setpoint step-changes so that the control quality of the subordinate control loop that includes the controller R and the process cannot be analyzed using conventional evaluation methodology.

With continued reference to FIGS. 1 and 2, in addition to the actual value PV a diagnostic device D also includes in the evaluation the setpoint SP. To this end, sequences of setpoint and actual-value data are stored in a data memory DS. An evaluation device AE uses these sequences to calculate a first dimension for the scatter of the actual-value data and, in a similar manner, a second dimension for the scatter of the setpoint data. The ratio of these two characteristic numbers is then used to calculate a first characteristic number $CPI_{Var}$ and a second characteristic number $CPI_{Kas}$ which are displayed to enable evaluation of the control quality.

The characteristic number $CPI_{Var}$ is calculated using the following formula:

$$CPI_{Var} = 100\% * \left( e^{s*0.5*\left(1-\frac{var(PV)}{var(SP)}\right)} \right),$$

wherein the variance var(PV) of the actual-value data as the first dimension and the variance var(SP) of the setpoint data as the second dimension are used as characteristic numbers for the scatter of the respective data. If the controller R is working ideally and successfully and accurately tracks the actual value PV with respect to the setpoint SP, the two variances var(PV) and var(SP) are approximately the same. According to the calculation formula for $CPI_{Var}$, this produces a value of about 100%. If, on the other hand, the variance var(PV) of the actual value PV is greater than the variance var(SP) of the setpoint SP, the controller R is evidently disrupting the control loop formed by the controller R and the process P. This is indicated by a value of the first characteristic number $CPI_{Var}$, which evidences deterioration of the control loop response by displaying a value of less than 100%. Changing the sensitivity factor s, which is preset with the value 1, enables a user to make adaptations as desired if, with a specific deterioration of the control loop response, lesser or greater changes to the first characteristic number $CPI_{Var}$ are to be displayed.

To calculate the second characteristic number $CPI_{Kas}$, the average change from one sampling step to the next in each case is calculated as the dimension for the scatter of the setpoint or the actual-value data. Hence, the formula is as follows:

$$CPI_{Kas} = 100\% * \frac{\sqrt{\frac{1}{2(N-1)}\sum_{i=0}^{N-1}(SP_{i+1}-SP_i)^2}}{\sqrt{\frac{1}{2(N-1)}\sum_{i=0}^{N-1}(PV_{i+1}-PV_i)^2}},$$

wherein the variance var(PV) of the actual-value data as the first dimension and the variance var(SP) of the setpoint data as the second dimension are used as characteristic numbers for the scatter of the respective data. If the controller R is working ideally and successfully and accurately tracks the actual value PV with respect to the setpoint SP, the two variances var(PV) and var(SP) are approximately the same. According to the calculation formula for $CPI_{Var}$, this produces a value of about 100%. If, on the other hand, the variance var(PV) of the actual value PV is greater than the variance var(SP) of the setpoint SP, the controller R is evidently disrupting the control loop formed by the controller R and the process P. This is indicated by a value of the first characteristic number $CPI_{Var}$, which evidences deterioration of the control loop response by displaying a value of less than 100%. Changing the sensitivity factor s, which is preset with the value 1, enables a user to make adaptations as desired if, with a specific deterioration of the control loop response, lesser or greater changes to the first characteristic number $CPI_{Var}$ are to be displayed.

To calculate the second characteristic number $CPI_{Kas}$, the average change from one sampling step to the next in each case is calculated as the dimension for the scatter of the setpoint or the actual-value data. Hence, the formula is as follows:

$$CPI_{Kas} = 100\% * \frac{\sqrt{\frac{1}{2(N-1)}\sum_{i=0}^{N-1}(SP_{i+1}-SP_i)^2}}{\sqrt{\frac{1}{2(N-1)}\sum_{i=0}^{N-1}(PV_{i+1}-PV_i)^2}},$$

wherein the value N reflects the length of the respective data window. Hence, the second characteristic number $CPI_{Kas}$ takes account of changes in smaller time intervals. If the actual value PV fluctuates around the setpoint SP, but with a smaller amplitude compared to the value range of the setpoint SP, the faulty response is more clearly evident from changes to the second characteristic number $CPI_{Kas}$ than from changes to the first characteristic number $CPI_{Var}$. Taking into account the two characteristic numbers $CPI_{Var}$ and $CPI_{Kas}$ advantageously assures that problems in subordinate control loops or the generation of erroneous messages due to faulty evaluations of such control loops will not remain unknown to an operator or monitor of the system.

If the controller R is a controller with a dead zone, an operator is additionally or alternatively able to activate the calculation of a third characteristic number $CPI_{Db}$ by the diagnostic device D. The object of a dead zone is to allay the actuating signals generated by the controller R for as long as the controlled variable, i.e. the actual value PV, within the dead zone Db is at the setpoint SP. Therefore, in order to reduce wear on and energy consumption of, for example, mechanical actuators, the controller R does not adjust for smaller control deviations that are still within the dead zone. Accordingly, a particularly informative criterion for the evaluation of controllers with a dead zone is the time slice $$t(|SP-PV|<Db),$$

in which the controlled variable PV is within the dead zone Db based on a time slice t(AK) with a constant setpoint in automatic mode AK. The calculation formula for the third characteristic number $CPI_{Db}$ is:

$$CPI_{Db} = \frac{t(|SP-PV|<Db)}{t(AK)} * 100\%.$$

If the time slice t(AK) is too short, this means that, for the combination of controller parameterization and dimensioning of the dead zone Db, the actual purpose of the dead zone Db, namely to allay the actuating signals, is only incompletely fulfilled because the control deviation leaves the dead zone Db too frequently. Therefore, either the dead zone Db is too narrow or the control response is too irregular. Following the display of a malfunction of this kind, the operator can make corresponding changes to the setting of the controller R to rectify the malfunction.

Figure 3:
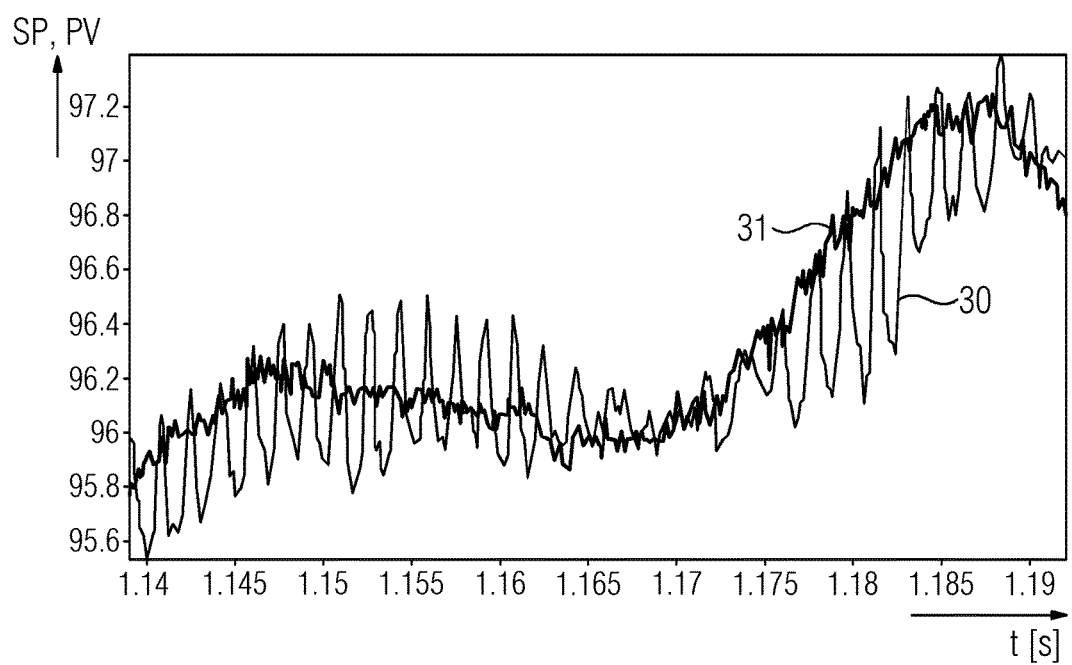
FIG. 3 is a timing diagram showing the courses of the setpoint and the actual value.

FIG. 3 depicts courses 30 and 31 of the actual value PV or the setpoint SP for the controller R, which is not optimally set, in a cascade control system such as that shown in FIG. 1. The abscissa of the timing diagram in FIG. 3 shows the time t in seconds and the actual value PV and the setpoint SP are plotted without dimensions on the ordinate. The illustrated segment of a larger sequence of setpoint and actual-value data includes about 500 data pairs. It can be seen from the course 30 of the actual value PV that there is evidently a fluctuation that does not result from the setpoint SP, but must have other causes. This fluctuation is in particular identified by the second characteristic number $CPI_{Kas}$ with a value of 60%. If the first characteristic number $CPI_{Var}$ is calculated over the entire window width, a value of approximately 100% is obtained and hence there is no indication of the problem since the variances of the setpoint and of the actual value are virtually identical over the time range considered. This example shows that, preferably, the first and the second characteristic number should be displayed to an operator in conjunction. Preferably the calculation of a minimum should be used for an aggregation of the two characteristic numbers: if the controller produces a negative result with reference to one or the other characteristic number, i.e. the minimum is below a specific limit value, then the operator should thereby be alerted to a possible problem in this control loop.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. It is the intention, therefore, to be limited only as indicated by the scope of the claims appended hereto

What is claimed is:

1. A diagnostic device for monitoring operation of a control loop in a meshed control structure of an automation system, the diagnostic device comprising:
  a data memory for storing sequences of both setpoint data and actual-value data for the control loop; and
  an evaluation device for determining a stochastic feature with reference to at least one segment of the sequences of setpoint data and actual-value data;
  wherein the stochastic feature determined for the actual-value data is a first dimension for scatter of the actual-value data, the diagnostic device being configured such that, for monitoring operation of a ratio control loop in the meshed control structure, the evaluation device is operable to determine a second dimension for scatter of the setpoint data as a stochastic feature of the setpoint data and to determine a characteristic number for evaluating the control quality as a function of a ratio of the first dimension to the second dimension, a sensitivity factor being changed such that an alarm is generated based on the determined characteristic value falling below a pre-specified value to provide a notification when deterioration of the control loop in the meshed control structure of the automation system has occurred.

2. The diagnostic device of claim 1, wherein the evaluation device is operable for determining a first characteristic number and a second characteristic number, the first and second characteristic numbers are the variance (var(PV), var(SP)) of one of the data of the actual value and the data of the setpoint, and the first characteristic number is calculated in accordance with the following relationships:

$$CPI_{Var} = 100\% * \left(e^{s*0.5*\left(1-\frac{var(PV)}{var(SP)}\right)}\right)$$

if $$\frac{\text{var}(PV)}{\text{var}(SP)} \geq 1,$$

and $$CPI_{Var} = 100\%$$

if $$\frac{\text{var}(PV)}{\text{var}(SP)} < 1,$$

wherein s is the sensitivity factor preset having a preset value of 1 and which is changeable by an operator of the diagnostic device, and $CPI_{Var}$ is the first characteristic value.

3. The diagnostic device of claim 2, wherein the first and second characteristic numbers comprise average changes to the actual-value data or to the setpoint data from one sampling step to a next sampling step, and wherein the second characteristic number is calculated in accordance with the following relationship:

$$CPI_{Kas} = 100\% * \frac{\sqrt{\frac{1}{2(N-1)}\sum_{i=0}^{N-1}(SP_{i+1}-SP_i)^2}}{\sqrt{\frac{1}{2(N-1)}\sum_{i=0}^{N-1}(PV_{i+1}-PV_i)^2}},$$

wherein N is the number of sampling steps included in the evaluation, and $CPI_{Kas}$ is the second characteristic value.

4. The diagnostic device of claim 1, wherein at least the data memory and the evaluation device are implemented in software on a remote service computer operable for remote diagnosis of the control loop.

5. A diagnostic method for monitoring operation of a control loop in a meshed control structure of an automation system, comprising:
- storing in a data memory sequences of setpoint data and of actual-value data of the control loop in the meshed control structure of the automation system;
- determining a stochastic feature with reference to at least one segment of the sequences of setpoint data and actual-value data by an evaluation device, the stochastic feature determined for the actual-value data being a first dimension for scatter of the actual-value data;
- determining a second dimension for scatter of the setpoint data as a stochastic feature of the setpoint data;
- determining and displaying a characteristic number for evaluating control quality as a function of a ratio of the first dimension to the second dimension; and
- changing a sensitivity factor such that an alarm is generated based on the determined characteristic number falling below a pre-specified value to provide a notification when deterioration of the control loop in the meshed control structure of the automation system has occurred.

6. A computer program stored in one of a storage device and a non-transitory computer-readable medium which, when executed on a processor of a computer apparatus, causes the processor to execute the method of claim 5.

7. A non-transitory computer readable medium encoded with a computer program executable by a computer apparatus to execute the method of claim 5.

\* \* \* \* \*